United States Patent [19]

Yonekura et al.

[11] Patent Number: 4,930,070
[45] Date of Patent: May 29, 1990

[54] INTERRUPT CONTROL METHOD FOR MULTIPROCESSOR SYSTEM

[75] Inventors: Mikio Yonekura, Hachioji; Jiro Kinoshita, Yamato, both of Japan

[73] Assignee: Fanuc Ltd., Minamitsuru, Japan

[21] Appl. No.: 138,459

[22] PCT Filed: Apr. 10, 1987

[86] PCT No.: PCT/JP87/00225
 § 371 Date: Nov. 25, 1987
 § 102(e) Date: Nov. 25, 1987

[87] PCT Pub. No.: WO87/06370
 PCT Pub. Date: Oct. 22, 1987

[30] Foreign Application Priority Data

Apr. 15, 1986 [JP] Japan .................................. 61-086921

[51] Int. Cl.$^5$ ............................................ G06F 13/24
[52] U.S. Cl. ...................................................... 364/200
[58] Field of Search ......................................... 364/200

[56] References Cited

U.S. PATENT DOCUMENTS 4,268,904 5/1981 Suzuki et al. ........................ 364/200
4,769,768 9/1988 Bomba et al. ........................ 364/200

FOREIGN PATENT DOCUMENTS 136862 8/1983 Japan .
59565 3/1986 Japan .
2110442 6/1983 United Kingdom .

OTHER PUBLICATIONS

Patent Abstracts of Japan, vol. 6, No. 112 (P-124) [990], Jun. 23, 1982; and JP-A-57 41 727 (Hitachi Seisakusho K.K.) 09-03-1982.
Patent Abstracts of Japan, vol. 9, No. 243 (P-392) [1966], Sep. 30, 1985; JP-A-60 95 678 (Mitsubishi Denki K.K.) 29-05-1985.

Primary Examiner—Thomas M. Heckler
Attorney, Agent, or Firm—Staas & Halsey

[57] ABSTRACT

An interrupt control method is provided for a multiprocessor system in which a plurality of processors (21, 31, 41) and an interface circuit (10) for causing interrupts are connected to a bus. According to the method, a particular address space (Addr1, Addr2, Addr3) is used as an interrupt address, and a mask bit corresponding to the address space is selected in each processor. The mask bit is stored in a register (24, 34, 44) in the processor. A bus cycle generator circuit in the interface circuit (10) is allowed to occupy the bus in response to an interrupt signal, and a bit indicative of a cause of an interrupt and corresponding to the address space is written into an address bus. The processor (21, 31, 41) recognizes an interrupt from the address bus bit corresponding to the address space (Addr1, Addr2, Addr3) and the mask bit stored in the register (24, 34, 44).

5 Claims, 2 Drawing Sheets

INTERRUPT CONTROL METHOD FOR MULTIPROCESSOR SYSTEM

BACKGROUND OF THE INVENTION

The present invention relates to an interrupt control method for a multiprocessor system, and more particularly, to an interrupt control method for a multiprocessor system, which enables each processor to recognize an interrupt without using a special interrupt control line.

As systems employing processors become more and more sophisticated and complex, multiprocessor systems are used wherein a plurality of processors is used in a single system. In such a multiprocessor system, the processors employed are interconnected by a bus. For effecting an external interrupt, therefore, each processor requires a special dedicated line for interrupts. The more CPUs used, the more such special interrupt lines are needed, resulting in increased hardware and lowered system flexibility.

SUMMARY OF THE INVENTION

It is an object of the present invention to provide an interrupt conrol method for a multiprocessor system, which solves the aforesaid problems, does not use any dedicated lines, and provides a higher degree of flexibility.

According to the present invention, the above problems can be solved by an interrupt control method for a multiprocessor system in which a plurality of processors and an interface circuit for causing interrupts are connected to a bus, the method including the steps of using a particular address space as an interrupt address, selecting a mask bit corresponding to the address space in each processor, storing the mask bit in a register in the processor, allowing a bus cycle generator circuit in the interface circuit to occupy the bus in response to an interrupt signal, writing a bit, indicative of a cuase of the interrupt signal and corresponding to the address space, into an address bus, and enabling the processor to recognize an interrupt signal from the address bus bit corresponding to the address space and the mask bit stored in the register.

With the above method, when an interrupt is caused, the bus cycle generator circuit in the interface circuit writes data into the address bit corresponding to the cause of the interrupt. Since the address space is defined as an interrupt address, the processor recognizes the interrupt, compares the address with the mask bit stored in the register in the processor, and recognizes the interrupt as an interrupt applied to itself. Therefore, no special hardware control line for interrupts is required.

DESCRIPTION OF THE PREFERRED EMBODIMENT

An embodiment of the present invention will hereinafter be described in specific detail with reference to the drawings.

Figure 1:
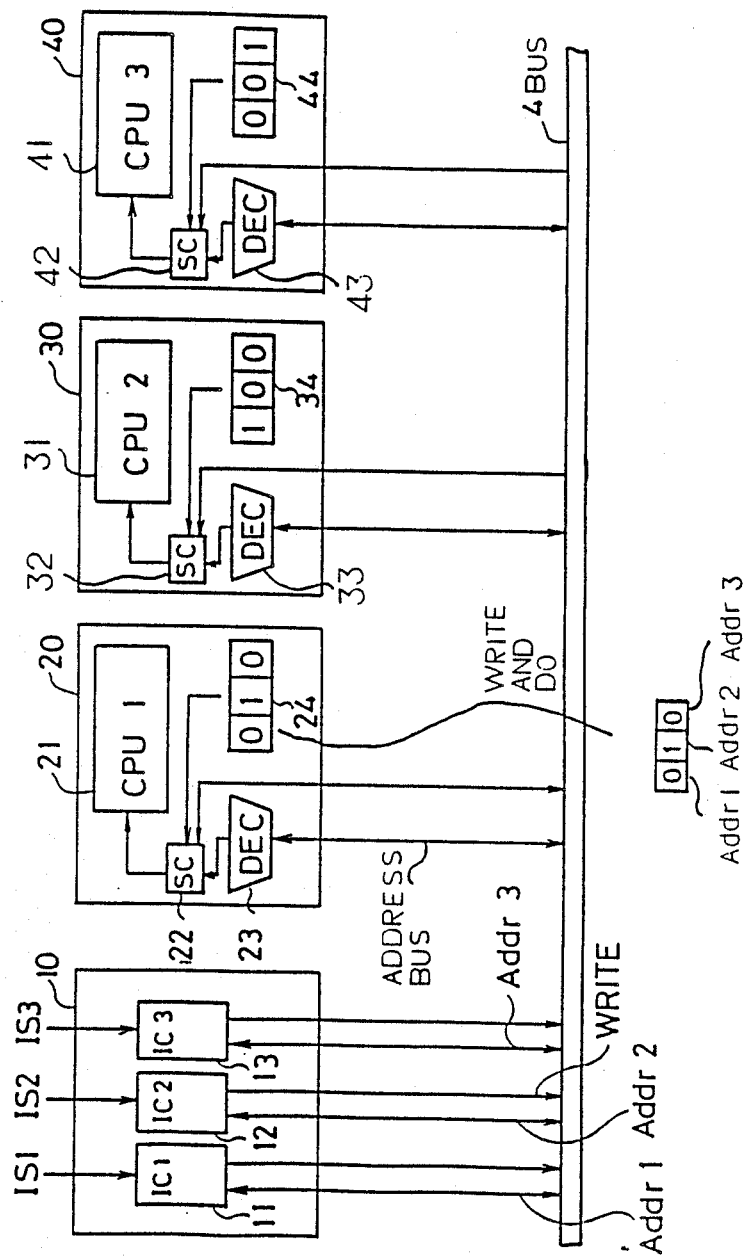
FIG. 1 is a block diagrm of an embodiment of the present invention.

FIG. 1 is a block diagram of an embodiment according to the present invention. An interface circuit 10 for receiving an external interrupt signal has control circuits 11, 12, and 13 for receiving respective interrupt signals IS1, IS2, and IS3.

A processor board 20 has therein a CPU1 21, a selector circuit (SC) 22, a decoder circuit 23, and a mask bit register 24. The decoder circuit 23 decodes an address bus input, compares it with the data stored in the mask bit register 24, and recognizes whether there is an interrupt signal applied to the processor 20.

Processor boards 30 and 40 are identical in structure to the processor board 20, and include CPU2 31 and CPU3 41, selector circuits 32 and 42, decoder circuits 33 and 43, and mask bit registers 34 and 44.

The interface circuit 10 and the processors 20, 30 and 40 are interconnected by a bus 4 comprising address buses, data buses, and commands such as READ and WRITE.

Operation will now be described below. Addresses Addr1, Addr2 and Addr3 in the entire address space are allotted to an interrupt. When an external interrupt signal IS2 is applied to the interrupt control circuit (IC2) 12, the interrupt control circuit 12 occupies the buses, and writes bit data Addr 2 corresponding to the interrupt signal IS2 into the address bus, and simultaneously writes "1" into a D0 bit in the data bus. The processor board 20 reads the data on the address bus, decodes it, and compares this bit data with the data in the mask bit register 24. The processor board 20 then recognizes the interrupt signal applied thereto by confirming that the D0 bit of the data bus is "1", and the CPU1 21 starts executing an interrupt program. The data stored in the mask bit register 24 is:

0, 1, 0 which corresponds to three addresses Addr1, Addr2 and Addr3, respectively.

The data of the mask bit register 24 represents which interrupt signal is directed to which processor, and can be modified in a program. In FIG. 1, the data items of the mask bit registers 24, 34 and 44 are determined such that the interrupt signal IS1 causes an interrupt with respect to the processor 30, the interrupt signal IS2 causes an interrupt with respect to the processor 20, and the interrupt signal IS3 causes an interrupt with respect to the processor 40.

Figure 2:
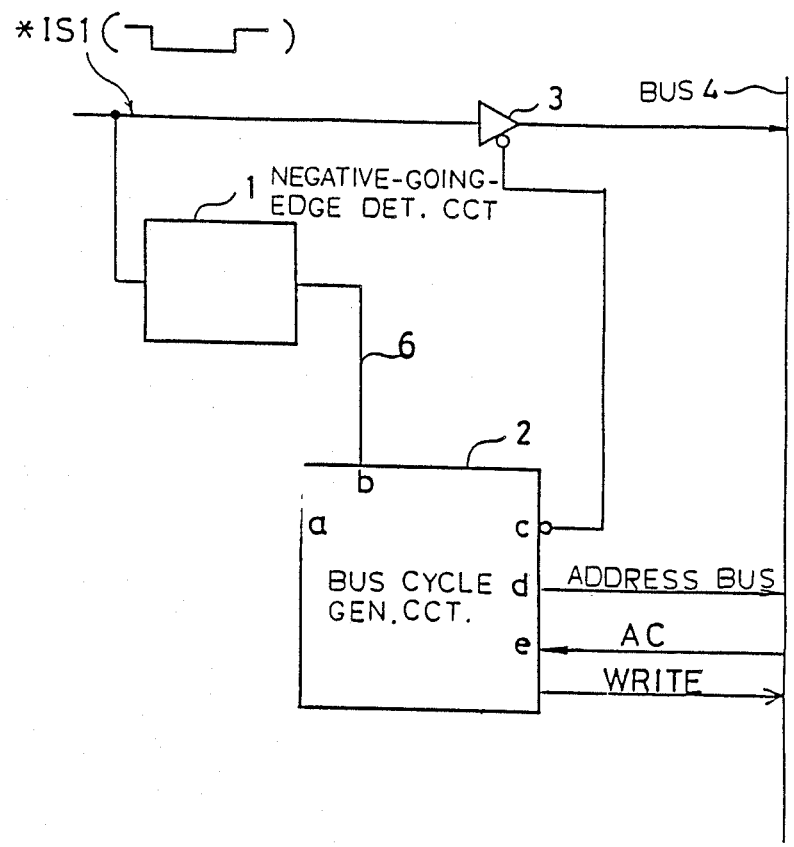
FIG. 2 is a detailed block diagram of an interrupt control circuit.

The interrupt control circuit 11 will hereinafter be described in detail. FIG. 2 is a block diagram of the interrupt control circuit (IC1) 11 in FIG. 1. The interrupt control circuit includes a negative-going-edge detector circuit 1 for detecting a negative-going edge of an interrupt signal, a bus cycle generator circuit 2 for controlling the bus in response to an interrupt, and request use of the bus 4 in response to a detected signal 6 from the negative-going-edge detector circuit 1. When the request is accepted, a signal AC (Aknowledge) at a terminal e of the bus cycle generator circuit 2 becomes active, allowing the bus cycle generator circuit 2 to occupy the bus 4. When the bus 4 is occupied by the bus cycle generator circuit 2, the bus cycle generator circuit 2 issues an address which is predetermined with respect to the interrupt signal to the address bus. In the illustrated embodiment, a 24-bit address Addr1 is issued in accordance with the interrupt signal IS1. At the same time, the bus cycle generator circuit 2 issues a signal via a terminal c to a bus driver 3 which in turn writes "0" into the D0 bit of the data bus. The interrupt signal is expressed here as *IS1 since it is represented as a reverse signal. When there is an interrupt, the interrupt signal becomes "0". Therefore, "0" is written into the D0 bit of the data bus.

The address has been described as being 24 bits. However, the present invention is also applicable to any desired address space. Though the D0 bit has been used as the data bit, any bit can be employed in accordance with a desired operation. Moreover, it is possible to expand the interrupt signals to include many interrupt signals by combining addresses and data buses.

With the present invention, as described above, no special hardware lines are necessary for interrupt signals, but rather, an address space is allotted to interrupt signals. Therefore, the number of interrupt signals can be increased as desired without requiring special hardware and by combining addresses and data buses.

A processor allotted to an interrupt can be varied as desired by rewriting an interrupt mask bit register with a program.

We claim:

1. An interrupt control method for a multiprocessor system in which a plurality of processors including a plurality of control circuits and an interface circuit for causing interrupts are connected to a bus, the number of control circuits corresponding to the number of processors, the method comprising the steps of:
    (a) employing a particular address having any number of bits as an interrupt address;
    (b) applying an interrupt signal to an interrupt control circuit, the interrupt control circuit sending bit data of the particular address onto an address bus;
    (c) selecting a mask bit, from a mask bit register, corresponding to the particular address in each processor;
    (d) storing the mask bit in a register in each processor;
    (e) reading the bit data on the address bus, decoding the data, and comparing the bit data with the mask bit data in the mask bit register;
    (f) allowing signals from a bus cycle generator circuit in the interface circuit to occupy the bus in response to an interrupt signal;
    (g) sending a bit, indicative of a cause of the interrupt and corresponding to the address, onto the address bus; and
    (h) enabling the respective processor to recognize an interrupt from the bit on the address bus corresponding to the address and the mask bit stored in the register.

2. An interrupt control method according to claim 1, wherein said step (d) includes rewriting the register.

3. An interrupt control method according to claim 1, wherein said step (f) includes allowing signals from the bus cycle generator circuit to occupy the bus in response to a negative-going edge of the interrupt signal.

4. An interrupt control method for a multiprocessor system including a bus for transmitting various data, the bus including a data bus, an address bus and a control bus, a plurality of processor boards coupled to the bus, the processor boards each including a processor, an address decoder coupled to the address bus, a selector circuit coupled between the address decoder and the processor, and a mask bit register coupled to the selector circuit, an interface circuit coupled to the processor boards through the bus for receiving an external interrupt signal, the interface circuit having the same number of interrupt control circuits as there are processor boards, said interrupt control method comprising the steps of:
    (a) inputting the external interrupt signal to one of the interrupt control circuits;
    (b) obtaining a right of use for a bus in accordance with the interrupt control circuits to which the interrupt signals are input to occupy the bus;
    (c) outputting a first address bit data to the address bus indicating an input of the interrupt signal from the interrupt control circuit to which the interrupt signal is input, and outputting interrupt bit data to the data bus indicating that a cause of the interrupt is an external interrupt;
    (d) outputting a second address bit data to the address bus indicating that the interrupt signal has not been input from the interrupt control circuit to which the interrupt signal has not been input;
    (e) decoding, by the address decoder, the first address bit data and the second address bit data and generating a first interrupt address;
    (f) comparing, in the selector circuit, the first interrupt address with the second interrupt address input to the mask bit register, and detecting whether the interrupt bit data has been output to the data bus;
    (g) enabling the microprocessor to recognize that the external interrupt signal has been input to the interface circuit when the first interrupt address coincides with the second interrupt address and simultaneously the interrupt bit data is detected; and
    (h) executing an interrupt program by the microprocessor in accordance with the external interrupt signal.

5. An interrupt control system for a multiprocessor system, comprising:
    a bus for transmitting various data, said bus comprising a data bus, an address bus, and a control bus;
    a plurality of processor boards coupled to said bus, each of said processor boards including:
        a microprocessor for executing a processing of an interrupt;
        a mask bit register outputting a first interrupt address allocated to said microprocessor;
        an address decoder, coupled to said address bus, for decoding first and second address bit data to generate a second interrupt address; and
        a selector circuit, coupled to said bus, said address decoder, said mask bit register and said microprocessor, for comparing said first interrupt address with said second interrupt address to detect whether an interrupt bit data has been output to said data bus;
    an interface circuit, coupled to said bus and to each of said processor boards, for receiving an external interrupt signal, said interface circuit including interrupt control circuits, the number of interrupt control circuits corresponding to the number of processor boards, said interrupt control circuits obtaining the right to use and occupy said bus upon receipt of said external interrupt signal and outputting to said data bus interrupt bit data indicating that the cause of the interrupt is an external interrupt, and at the same time, outputting to said address bus the first address bit data indicating that said external interrupt signal has been received, said interrupt control circuits, to which said external interrupt signal has not been input, outputting the second address bit data to said address bus indicating that said external interrupt signal has not been received, said selector circuit enabling said microprocessor to recognize that said external interrupt signal has been input to said interface circuit when said first interrupt address coincides with said second interrupt address and simultaneously said interrupt bit data is detected.

* * * * *